United States Patent [19]

Van Cappellen et al.

[11] Patent Number: 4,892,689
[45] Date of Patent: Jan. 9, 1990

[54] PROCESS FOR MAKING CURLED PHOTOGRAPHIC FILM

[75] Inventors: Jan B. Van Cappellen, Schilde; Luc M. De Groot, Aarschot; Gery Vancoppenolle, Weerde; Daniël G. Vandenbrande, Mortsel; Jan K. De Keyzer, Schilde, all of Belgium

[73] Assignee: AGFA-Gevaert N.V., Mortsel, Belgium

[21] Appl. No.: 218,919

[22] Filed: Jul. 14, 1988

[30] Foreign Application Priority Data

Jul. 14, 1987 [XH] Hague .................. EP8720/348.7

[51] Int. Cl.$^4$ ............................................. B29C 35/10
[52] U.S. Cl. .................................... 264/25; 264/129; 264/134; 264/146; 264/210.5; 264/235.8; 264/285; 264/289.6; 264/290.2; 264/346; 264/DIG. 65
[58] Field of Search ............... 264/235.8, 235, 285, 264/289.6, 210.5, 290.2, 342 R, 342 RE, 346, 25, DIG. 65, 339, 129, 134, 146

[56] References Cited

U.S. PATENT DOCUMENTS

| | | | |
|---|---|---|---|
| 3,873,664 | 3/1975 | Curtis et al. | 264/235.8 |
| 4,093,695 | 6/1978 | Heirbaut | 264/346 |
| 4,140,740 | 2/1979 | De Smedt et al. | 264/342 RE |
| 4,141,735 | 2/1979 | Schrader et al. | 264/235 |
| 4,293,508 | 10/1981 | Heirbaut et al. | 264/289.6 |
| 4,617,164 | 10/1986 | Kanesaki et al. | 264/235.8 |

FOREIGN PATENT DOCUMENTS

| | | |
|---|---|---|
| 0022278 | 2/1984 | European Pat. Off. |
| 61-233523 | 10/1986 | Japan .................. 264/210.5 |
| 1030288 | 5/1966 | United Kingdom . |

Primary Examiner—Jeffery Thurlow
Attorney, Agent, or Firm—William J. Daniel

[57] ABSTRACT

In a known process of making biaxially oriented polyethylene terephthalate photographic film, a certain amount of curl in the longitudinal direction can be imparted to the film by carrying out the longitudinal stretching step of that process while the film is asymmetrically heated across its thickness to a temperature gradient Delta T across the film of at least 10° C. while the longitudinal stretching tension applied to the film is less than 10 N/sq.mm.

10 Claims, 7 Drawing Sheets

PROCESS FOR MAKING CURLED PHOTOGRAPHIC FILM

DESCRIPTION

The present invention relates to a process for making oriented photographic polyethylene terephthalate film having a substantial amount of curl.

Oriented polyethylene terephthalate film is a material that is affected at all stages of its life by the existence in the film of an inherent tendency to acquire a "set" on aging. This set may be referred to in the art as "core-set" when the set conforms to a core or tube on which the film has been wound and stored. The set can also occur in the absence of a core, for example when the film is rolled without a supporting core. The term "core-set" as used herein refers to both forms of set. Core-set may be explained as the result of plastic flow deformation imparted to self-supporting thermoplastic film when it is wound, and especially when it is wound on a core and stored at ambient conditions of temperature and humidity for a period of time sufficient for the film to acquire a substantially permanent curvature in the direction of its winding on the core. Core-set increases with an increase in storage temperature and storage time and with a decrease in roll diameter.

The problem of development of undesirable amounts of core-set in polymer films during storage in roll form is especially troublesome in the processing and use of photographic elements which comprise a high core-set-prone thermoplastic polymeric support material, especially polyethylene terephthalate. A high degree of curling tendency, or core-set-proneness, is particularly undesirable for a film element is intended to be used in the form of a flat film product, such as a microfiche. Such a film element, in its usual form, is a substantially flat piece of processed transparent photographic film usually measuring about 4" high and 6" wide, which bears projectionable microsized photographic images. Microfilms are widely used in storage and retrieval of information which can be projected and viewed on display panels or screens of readers or reader/printers. Efficient making, processing, storing, retrieving, reading and returning to storage of such small film elements by high speed machines requires a high degree of flatness, or absence of core-set, in the film element.

It has been proposed to heat-temper a self-supporting film to reduce the core-set curling tendency of said film without distorting or shrinking said film by maintaining the film, while in the form of a stock roll of film, for a period of about 0.1 to about 1500 hours at a temperature ranging from about 30° C. up to the Tg (glass transition temperature) of said polymer and an ambient relative humidity less than 100% until the core-set curling tendency of the film is reduced by at least 15%. This method is disclosed in US-A-4 141 735. It shows the disadvantage that the resulting reduction in curling tendency may not be sufficient in all cases, and that it requires an additional step in the manufacturing process, which is time consuming and, moreover, requires additional equipment since it is substantially an, i.e., batch-type, treatment in an otherwise, i.e., continuous film production process. Another unfavorable aspect of this method is an increased risk of damaging the (subbed) surface of the film as a consequence of the increased temperature involved in the process.

It has further been proposed to control the curling tendency of a longitudinally stretched film, by coiling a film that has a certain coiling tendency in the opposite direction onto a relatively small roll. If the film remains in the coiled-up condition for a considerable time, there is a tendency for the coil set caused by the longitudinal stretching process of the film to be partially offset. This technique is disclosed in GB-A-1 030 288. The method of the GB patent comprises the longitudinal stretching of a film by contacting one film surface in succession with one heated and one cooled roller, while the other film is being urged into contact with the temperature-controlling rollers by means of rubber-like nip rollers acting on its other surface. This stretching technique is unsuited for the production of a polymeric film base for use as a support for photographic film, because the surface quality of film thus stretched does not meet the stringent quality requirements of the photographic industry.

The present invention aims at providing a new method for the introduction of a permanent longitudinal curl in a film during its manufacturing process, whereby it becomes possible to provide a flatter film to the end-user, based on the compensation of the core-set curl caused by the final spool onto which the film is wound, by an initial curl that was intentionally imparted to the film during its manufacture.

According to the present invention, a process for making biaxially oriented photographic polyethylene terephthalate film having a given amount of longitudinal curl, comprising extruding molten polyethylene terephthalate polymer through a flat die onto a cooling drum, subjecting the film to molecular orientation by stretching the film longitudinally and transversely, and heat-setting the film, wherein the film is longitudinally stretched by applying longitudinal stretching forces to the film while heating the film, said heating comprising first pre-heating the film to increase the film temperature but not sufficiently for plastic elongation to occur, and then stretch-heating the film to a temperature above the Tg in a zone where the film is not supported by any roller, whereby rapid plastic elongation occurs under the stretching forces, and next rapidly cooling the film to a temperature below the Tg to stop the stretching, is characterized in that the longitudinal stretch-heating of the film occurs asymmetrically so that a temperature gradient Delta T exists across the film thickness, i.e. from one surface of the film to the other, which is greater than 10° C., and that the longitudinal tension of the film during the stretching is less than 10 N/sq. mm.

The term "Delta T" stands in the present specification for the difference between the temperatures measured on both surfaces of a given place of the film. The temperature of any point between said surfaces of the film may fall between the measured surface temperatures of the film, but it may also happen that some film strata between the outer surfaces of the film, have a temperature that is lower than the temperatures of such outer surfaces.

The term "a given amount of curl" denotes in the present specification (unless otherwise specified, i.e., with reference to very small winding diameters) a longitudinal curl of the film at least equal to 5 mm, when measured in accordance with test method C of the international standard ISO 4330-1979 (E) for the determination of the curl of photographic film. This test method is particularly intended for film in sheet form or microfiche, and it is a practical way of measurement combining the effects of film curl with gravity. According to the test procedure, a sheet to be measured is placed with the concave side upward on a horizontal table at the end of a conditioning period and without removing the sheet from the conditioned atmosphere. The distance at each of its four corners between the test sheet and the table is measured in millimeters to the nearest millimeter, and then the arithmetical average value is calculated. The film sheets measured 4"×6" in the present measurements.

The term "glass transition temperature" (Tg) is described hereinafter in more detail.

At sufficiently low temperatures all amorphous polymers or polymer regions of semicrystalline polymers are known to assume characteristics of glasses, such as hardness, stiffness and brittleness. Polymers in the glassy state are further characterized by a low volume coefficient of expansion, when compared with that of the polymer in the fluid state. In this respect polymers in the glassy state resemble crystalline polymers which are also characterized by a low volume coefficient of expansion. The temperature interval within which the volume coefficient of expansion of the amorphous polymer changes from a high to a low value is the glass transition temperature range. The glass transition temperature of a polymer cannot be properly defined as a specific temperature value, although this is frequently done in the literature. In fact, the glass transition temperature of a polymer is rate-dependent, i.e. it is dependent on the rate of heating or cooling of the polymer sample during the analytical determination of the volume coefficient of expansion. The faster the rate of heating or cooling of the polymer sample during this analysis, the wider will be the range of glass transition temperature. The opposite relationship applies when the sample is heated or cooled slowly. In view of this rate dependence, specific glass transition temperature values refer to the midpoint of the glass transition temperature range on the endothermic peak of a polymer. The value of the transition temperature of a polymer increases with its degree of crystallinity. In the literature the glass transition temperature of commerical polyethylene terephthalate has been reported to be about 67° C. for the amorphous polymer, about 81° C. for crystalline, non-oriented polymer and about 125° C. for high crystalline, biaxially oriented polymer.

The curling effect obtained according to the method of the invention is a consequence of the difference in orientation of the film, considered across the thickness of the film. The differences in orientation cause corresponding differences in physical properties such as the modulus of elasticity, the crystallinity, the refraction indices, and the coefficient of thermal expansion from one surface to the other of the film. Large differences of the coefficient of thermal expansion, and of the E-modulus in particular, cause unequal longitudinal tensions in the film from one film surface to the other whereby the film will curl in the longitudinal direction. The film curl in the transverse direction is zero, since the inventive treatment does not cause any differential heating in the transverse direction of the film.

The resulting curling tendency of the film is also related to the average temperature of the film during the stretching and it has been shown that a higher average film temperature causes a higher film curl. The average film temperature is difficult to determine since the temperature gradient across the thickness of the film is not linear. Yet, it is the average temperature which the film has obtained at the stretch-heating, that determines the resistance of the film against its plastic deformation, or in other words that determines the longitudinal stretching force that is created in the film as a consequence of its undergoing stretching by a given amount (common stretch ratios are between 2.5 and 3.5). For that reason, the longitudinal stretching tension of the film is used in the present specification as the relevant factor that determines, in combination with the temperature gradient Delta T over the film thickness, the curling tendency of the film.

The longitudinal stretching force of the film can be measured by conveying the film, while being stretched, over a roller, the bearing blocks of which are mounted via pressure sensors on the supporting frame. The sum of both measured forces i.e., at both ends of the roller must be multiplied by a coefficient depending on the wrapping angle of the film around the measuring roller, in order to get the actual longitudinal film stretching force. The longitudinal stretching tension is the quotient of the stretching force divided by the cross-section of the film.

In the performance of the method according to the invention, it has been shown that the stretch-heating of the film may advantageously be done by exposing one film side to mediumwave IR-radiation and the opposite film side to shortwave IR-radiation. By mediumwave IR-radiation as considered in the present specification is meant electromagnetic radiation within a range of approximately 2000 to 4000 nm (nanometer), whereas shortwave IR-radiation is within a range of approximately 1000 to 2000 nm. The filament temperature of common medium wave radiators is of the order of magnitude of 900° C., whereas the filament temperature of short wave radiators is approximately 2100° C.

Shortwave IR-radiation is poorly absorbed by the film, and causes therefore a relative homogeneous heating of the film, resulting in a small Delta T over the film thickness.

mediumwave IR-radiation, on the contrary, is rather well absorbed by the film and therefore causes an appreciable increase in temperature of the outer film stratum facing the IR source, whereas the remainder of the film thickness is much less affected by the radiation.

As a result shortwave IR-radiation is well suited for determining the average temperature of the film, whereas the mediumwave IR-radiation is appropriate to control the temperature gradient Delta T across the film. In such a configuration, the film surface facing the mediumwave radiation, will obviously reach a higher temperature.

However, the heaters may also be adjusted in such a way that the shortwave IR-radiation produces the higher of the two film surface temperatures, whereas the mediumwave radiation produces the lower film surface temperature.

Furthermore, the differential stretch heating of the film may also be practiced in using shortwave IR-radiation at both sides of the film.

According to a suitable embodiment of the process according to the invention, the film temperature gradient Delta T is more than 15° C.

According to a further suitable embodiment of the invention, the longitudinal tension of the film during stretching is less than 7 N/sq. mm.

The process as described in the preamble of the statement of invention hereinbefore is disclosed e.g. in EU-B1-22278 entitled: "Method and apparatus for longitudinally stretching a substantially amorphous polyethylene terephthalate film".

The rapid cooling of the film to terminate the longitudinal stretching is preferably done by conveying the film into a body of cooling liquid. This has the advantage that the longitudinal stretching of the film is stopped rapidly whereby the necking-in of the film under the influence of the stretching forces may be reduced. Further information about this technique may be found in EU-B1-22278 mentioned already.

The asymmetric heating of the widthwise film according to the present invention in such method wherein cooling of the film is effected by conveying the film into a body of cooling liquid, has moreover the effect that the quiescence of the free surface of the cooling liquid is greatly improved, as has surprisingly been found. This finding should not be underestimated since it has been shown that a rippling liquid surface may cause unacceptable surface defects in the cooled film.

As is known in the photographic film manufacturing art, the presence of a gelatin, or other hydrophilic coating or subbing layer on one surface of a hydrophobic film will cause the film to curl towards the coated surface where humidity is decreased due to loss of moisture in the coating layer. The presence of a longitudinal stretching a hydrophilic layer must be taken into account in making comparisons of curl values. In the examples of the present specification, the film samples were cut from uncoated film. For convenience of comparison, all curl values were determined at 50% of relative humidity in order to minimize the effects of abnormal ambient relative conditions.

The process according to the present invention is not limited to the production of film elements to be used in the form of flat products, such as microfiches, but may be used as well for the production of film to be wound in the form of film strips onto cores with a small diameter, such as 35 mm amateur films wound on film spools with a diameter as small as 12 mm. The process according to the invention may in this case not result in a completely a flat film strip as the film is unwound from the core, but it will in any event result in an important reduction of the core-set curl. The process according to the present invention will be described hereinafter by way of example with reference to the accompanying drawings, wherein:

FIG. 6a is a diagram illustrating the evolution of film curl for two core diameters, at room temperature, whereas

Figure 1:
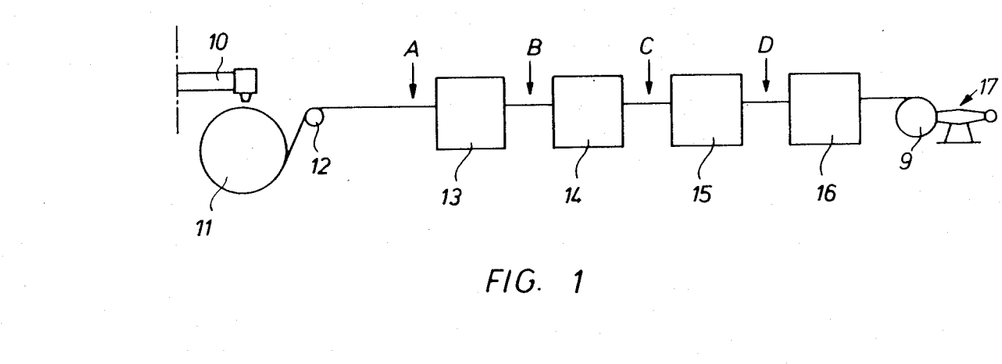
FIG. 1 is a diagrammatic illustration of an equipment for producing stretched polymeric film.

Referring to FIG. 1, a typical equipment for the production of biaxially stretched and heat-treated polymer film comprises an extruder 10 for the extrusion of the film polymer in the form of a molten polymer curtain, a cooling roller 11 for cooling the film to below its Tg, a guide roller 12, a longitudinal stretching device 13 wherein the film is stretched longitudinally while at a temperature above its Tg, a transverse stretching device 14 wherein the film is stretched transversely while at a temperature above its Tg, a heat-setting zone 15 wherein the film is kept at a temperature between the Tg and the Tm (melt temperature) of the polymer, while the film is prevented from shrinking, in order to increase the crystallinity of the film, a heat-relaxing device 16 wherein the film is held at a reduced longitudinal tension while it is heated, and finally a wind-up station 17 where the film is wound to a stock roll 9 of film.

In stages of its production process as indicated e.g. by the points A, B, C and D, the film may be coated with one or more subbing layers in view of the application of one or more photographic layers in a later stage of the production process. The subbing layers may be coated on one or both sides of the film, in the form of a monolayer or of twin layers. The photographic layers may include gelatinous light-sensitive, colour filter, protective and other layers.

Figure 2:
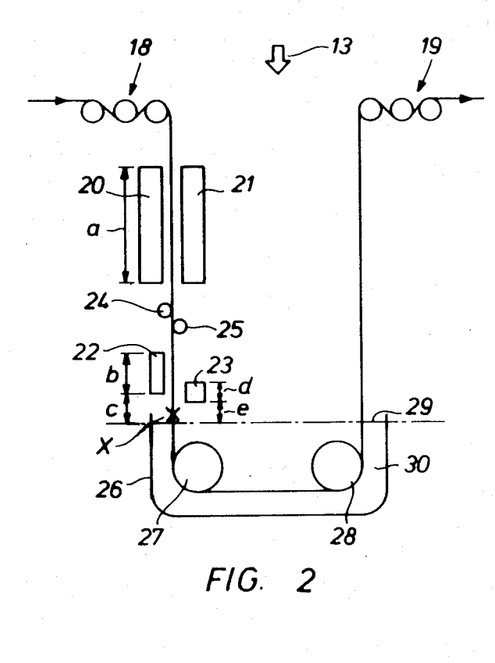
FIG. 2 is a diagrammatic detail view of the longitudinal stretching device in the equipment of FIG. 1.

The longitudinal stretching device 13 of FIG. 1 is illustrated in detail in FIG. 2. The device comprises slowly and rapidly rotating traction means for causing a longitudinal traction on the film. In the present example, the traction means comprise sets of driven rollers 18 and 19 around which the film is wrapped for establishing a good contact. The rollers may be hollow metal rollers that may be temperature-controlled, but each roller set may also be in the form of one or more suction rollers capable of transmitting a traction force to the film.

The pre-heating of the film to a temperature below that at which plastic elongation of the film occurs, is done by means of first IR-heaters 20 and 21 disposed symmetrically at both sides of the downward film path. The heaters comprise a plurality of IR rodlike heater lamps that are mounted in a rectangular casing with open i.e., facing the film path, and in a plane close to the plane of the film. A forced current of cooling air is maintained through each casing for keeping the temperature under control.

The stretch-heating of the film is done by means of second IR-heaters 22 and 23 that are capable of creating an asymmetric heating widthwise of the film, to an extent such that a temperature difference Delta T exists between the two sides of the film of at least 10° C., and also such that stretching of the film can take place under the influence of the speed difference between the rollers 18 and 19, at a longitudinal tension that is less than 10 N/sq. mm.

The film stretching temperatures at both sides of the film were measured in the present embodiment at point X which was at 20 mm from the level of the cooling liquid 30. The measurements occurred by means of a common pyrometer.

The longitudinal tension of the film was determined by dividing the actual stretching force by the film cross section, as explained already hereinbefore.

In the present embodiment, the heater 22 is a mediumwave heater whereas the heater 23 is a shortwave heater. The effective lengths of the heating gaps or zones of the different heaters have been indicated by a, b and d, respectively.

Between the pre-heaters and the stretch-heaters two free-rotating rollers 24 and 25 are provided, causing a very slight deviation of the film path and preventing thereby any vibration of the weakened film under the longitudinal stretching forces.

The cooling section comprises a container 26 with two free-rotating rollers 27 and 28 below the level 29 of a body of cooling water 30. Means are provided, not illustrated, for controlling the level of the cooling water, and for circulating, filtering, and temperature-controlling the water. Further details about an installation of this kind may be found in EU-B1-22278 already referred to. Such details are not required for the understanding of the operation of the present invention.

Rolls of film support which are manufactured as described hereinbefore, are transferred to a coating installation where they are unwound, and one or more photographic layers are coated on the film by means of any of the coating installations that are commonly used in the photographic industry. The coated rolls of film are unwound once again in a finishing equipment, where the film is slit into the required strip formats, or flat sheet formats. The strips can be wound into small rolls with an inner diameter which may be as small as 50 mm, and which are light-tightly wrapped e.g. in a dispensing cassette with a light-tight exit slot. Such cassettes may be loaded by daylight into an exposure apparatus that is arranged for pulling for each exposure a required length from the roll of film, image-wise exposing such length, and then cutting and processing the cut film sheet. The winding and unwinding operations during the manufacturing process are such that the film side situated at the outside on the large rolls of the winder 17 in FIG. 1, will be at the inside of the smaller rolls of the end-user in order to offset the core-set of the latter.

The film curl that may be obtained with the process according to the present invention, is described hereinafter with reference to the examples.

EXAMPLES

A polyethylene terephthalate polymer having an inherent viscosity of 0.57 dl.g$^{-1}$ was extended at a rate of 150 kg.h$^{-1}$ and at a temperature of 290° C., through a conventional elongated extrusion die 10 having an orifice with a width of 2.5 mm. The molten polymer was received on a cooling drum which was driven at a rate of 6 m.min$^{-1}$. The film temperature amounted to 25° C. as the film left the cooling drum 11. The film was fed to the rollers 18 of the longitudinal stretcher 13. These rollers were driven at a rate of 8 m.min$^{-1}$ and the film was maintained at a surface temperature of 25° C. The thickness of the film entering the stretcher 13 was 1100 micrometer.

The first IR-heaters 20 and 21 each comprise 8 parallelly spaced IR-lamps of the type "shortwavelength", with a maximum electric power of 80 Watts/linear cm at a voltage of 625 V. The maximum of the emission spectrum of the lamps was situated at approximately 1170 nm. The lamps were gas-filled twin quartz tubes with a tungsten filament. The voltage applied to the lamps was 625 V. The distance between the lamps and the film was 50 mm. The distance a amounted to 400 mm. The surface temperature of the film leaving the heaters 20 and 21 amounted to 80° C.

The heater 22 of the second IR heaters comprises 8 parallelly spaced lamps of the type "middlewavelength" with a maximum electric power of 16.25 Watts/linear cm at a voltage of 220 V. The maximum of the emission spectrum was 2500 nm. The voltage applied to the lamps was adjustable. The distance b amounted to 160 mm and the distance c was 60 mm.

The heater 23 of the second IR-heaters comprises 5 parallelly spaced IR-lamps of the type "shortwavelength" with a maximum power of 80 Watts/linear cm at a voltage of 625 V. The maximum of the emission spectrum was situated at approximately 1170 nm. The lamps had a Tungsten filament. The distance d amounted to 100 mm, and the distance e was 20 mm.

The stretch ratio of the film was 3.3:1.

Figure 3:
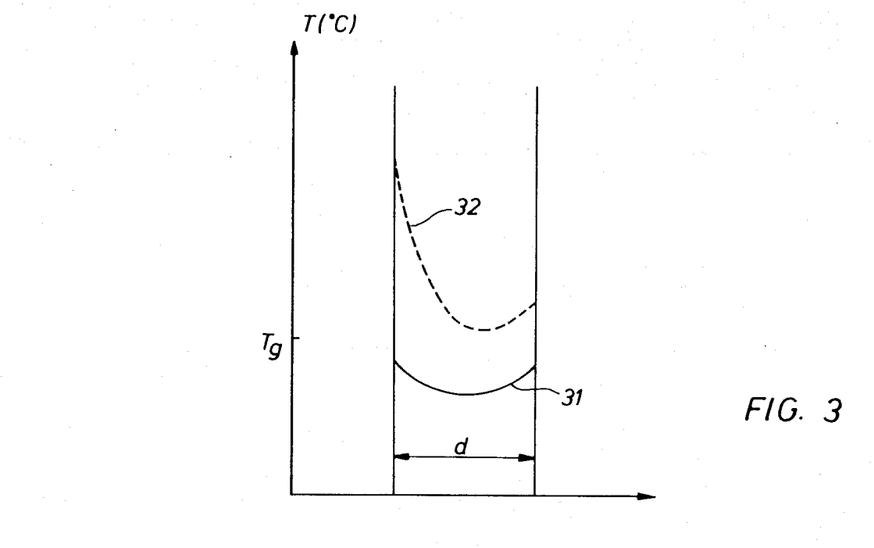
FIG. 3 is a diagram illustrating the temperature gradient across the film thickness.

The diagram of FIG. 3 illustrates temperature gradients Delta T across the film that are typical for the described longitudinal stretching process. The abscissa represents the film thickness d and the ordinate the film temperature in ° C. The curves do not result from actual temperature measurements (except for the temperature at the outer film surfaces that were effectively measured) but they are based on the knowledge of absorption of IR-radiation by the film.

The curve 31 stands for the temperature gradient across the film measured between the pre-heaters and the stretch-heaters. This temperature gradient results from the shortwave heating of the film by the heaters 20 and 21.

The curve 32 stands for the temperature gradient across the film at the point X of FIG. 2, and is the result of the widthwise asymmetric stretch-heating deliberately imparted to the film in accordance with the process of the invention.

The asymmetrically longitudinally stretched film was stretched transversely, and then heat-set, heat-relaxed and wound onto a roll. The film was then unwound and samples measuring 4"×6" were cut from the film, the longitudinal axis of the samples coinciding with the longitudinal axis of the film.

The film that is longitudinally stretched in the described way obtains its curling tendency as a consequence of the temperature gradient Delta T across the film thickness. The highest film temperature causes the smallest modulus of elasticity and the greatest coefficient of thermal expansion of the film material whereas the lowest film temperature causes the highest E-modulus and the smallest thermal expansion coefficient. Said differential moduli of elasticity and thermal expansion coefficients, considered across the thickness of the film, cause the curling of the film once it has been cooled. The concave side of the curled film is the side with the lowest modulus of elasticity and the highest thermal expansion coefficient.

Figure 4:
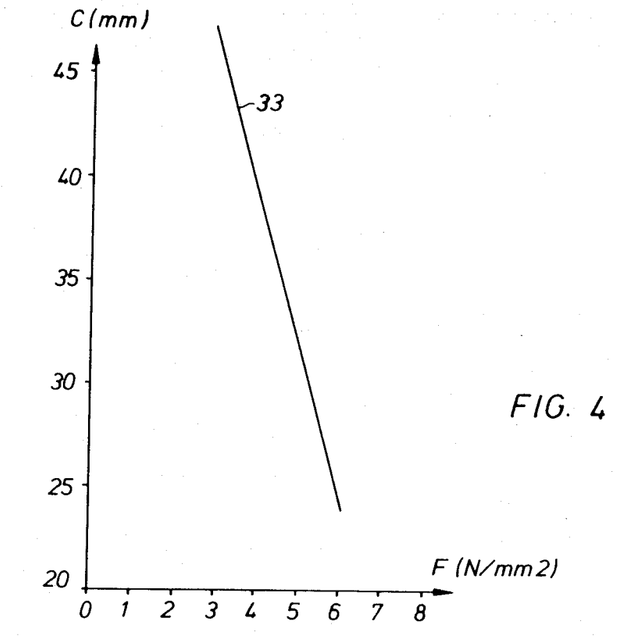
FIG. 4 is a diagram illustrating the curl as a function of the longitudinal stretching tension for different temperature gradients Delta T through the film.

The diagram of FIG. 4 illustrates the measuring results for a film with a thickness of 110 micrometer.

The abscissa of the diagram shows the film tension during the longitudinal stretching in N/sq. mm, calculated by dividing the total stretching force by the cross-section of the film, in the present example 500 sq. mm. The ordinate of the diagram shows the corresponding curl of the film sample, measured in accordance with the standard as described in the introduction. It was shown that there was only a slight difference between the curl of samples cut from the inner and those cut from the outer roll windings.

The curve of the diagram of FIG. 4 was obtained as follows.

For one given example, the power of the shortwave heater 23 was altered by varying the supply voltage, and the power of the mediumwave heater 22 was correspondingly adjusted until the same stretching tension as before was obtained. The process was repeated until a number of measuring points were obtained for one given stretching tension. Each measurement resulted in a different Delta T over the film.

Thereupon the heaters were set for a different stretching tension, and were then relatively adjusted to obtain a number of measuring points for said other stretching force. Also these other measuring points were obtained at different Delta T's.

The process was repeated for a number of different stretching tensions. In the described way, the operational field of the longitudinal stretcher was explored and a number of measuring points were obtained that are scattered across the diagram area.

Finally, the measuring points pertaining to a specific Delta T were interconnected to yield the curve 33.

The curve stands for a polyethylene terephthalate film with a Delta T of 30° C., that will serve as a support in the manufacturing of radiographic film.

Figure 5:
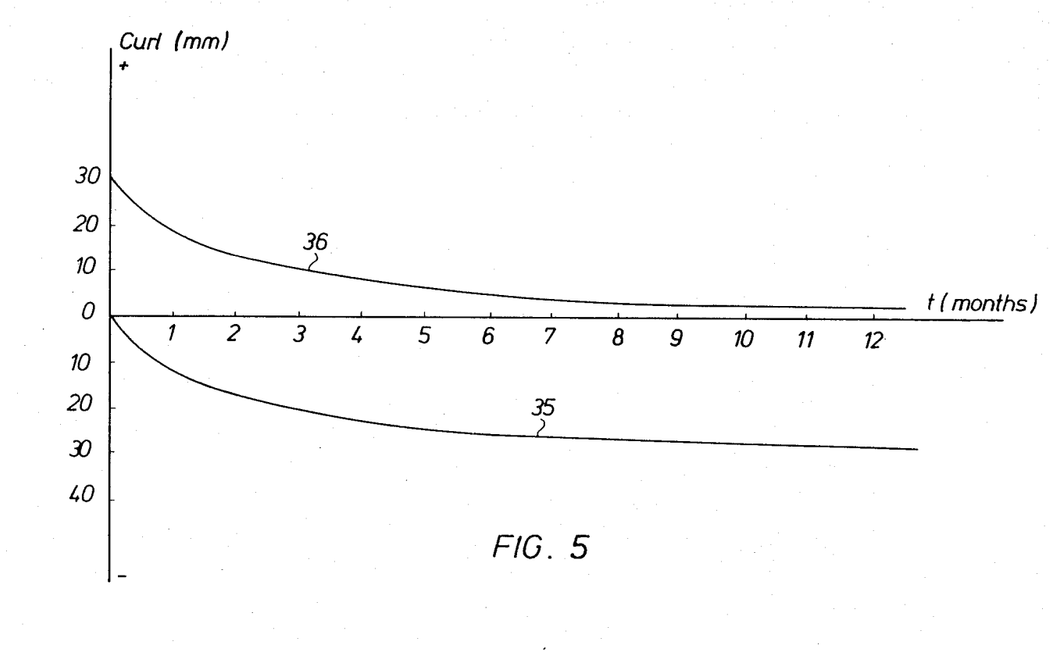
FIG. 5 is a diagram illustrating the behaviour of curl as a function of time.

The diagram of FIG. 5 illustrates the evolution of the film core-set curl as a function of time for a polyethylene terephthalate film with a width of 100 mm and a length of 10 m wound on a core with a diameter of 50 mm and kept at a temperature of 25° C. The core-set curl values in the diagram are average values calculated from the several film windings on the core.

The abscissa of the diagram is a time axis t in months, whereas the ordinate represents the film core-set curl C in mm. The notion — represents the film curl in the direction of the core, and the notion + represents the curl of a film sample in the opposite direction. The curve 35 represents the curling behaviour of a film that was made in accordance with the heat-tempering process described in US-A-4141735, whereas the curve 36 stands for a film that was made in accordance with the process of the invention. The curve 35 shows that a film, even when it is perfectly flat and heat-tempered at the moment it is wound on a small diameter core, gets a curl on ageing that amounts to almost 30 mm after 12 months. The curve 36 illustrates that anticipation of the core-set proneness by an initial curl of 30 mm, permits one to obtain after 6 months, which is in practice the earliest date of use of the film, a curl of 5 mm, and after 12 months a curl of only 2.5 mm.

Figure 6A:
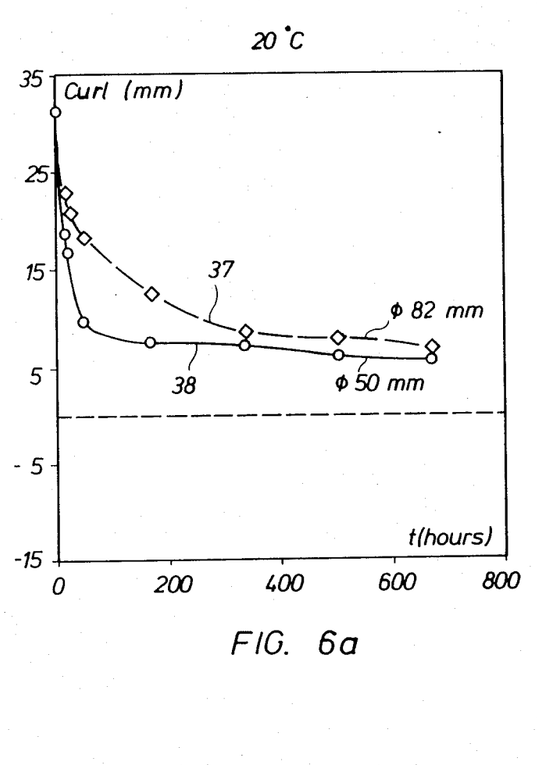
Figure 6B:
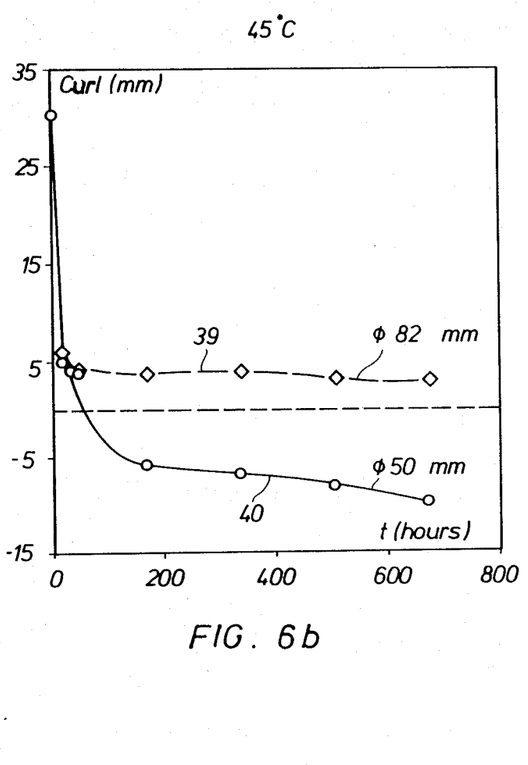
FIG. 6b is a diagram illustrating the evolution of the same film samples at 45° C.

The diagram of FIG. 6a illustrates the evolution in time of film curl for two different film winding diameters, namely the curve 37 for a diameter of 82 mm and the curve 38 for a diameter of 50 mm, while the samples were kept at 20° C., whereas the curves 39 and 40 of FIG. 6b illustrate the evolution of the same film samples at a temperature of 45° C. The test at 45° C. is an accelerated storage test, a time lampse of 16 Hrs at 45° C. corresponding with a period of 6 to 12 months at a temperature of 20° C.

The measurements occured on PET film samples with a thickness of 0.1 mm measuring 4"×6", that were uncoated, and that were cut from a film manufactured in according with the process of the present invention to a deliberate curl of 30 mm, measured in accordance with the test method described hereinbefore. The film samples were wound on cores with diameters of 50, respectively 82 mm for the following reason. The diameter of 50 mm is the diameter of a naked core, whereas the diameter of 82 mm is the outer diameter of a usual complete roll of microfilm from which the sheets are cut by the end-user. The winding of a filmsheet sample on a core occured such that the core-set curl opposed the intrinsic film curl.

FIG. 6a illustrates that at a temperature of 20° C., the curl for both winding diameters remain in the sense of the film production curl.

FIG. 6b illustrates that for very long storage times (200 Hrs at 45° C. correspond with at least 6 years at 20° C.), the initial production film curl is overcome by the core-set curl for the sample wound on the 50 mm core.

Figure 7:
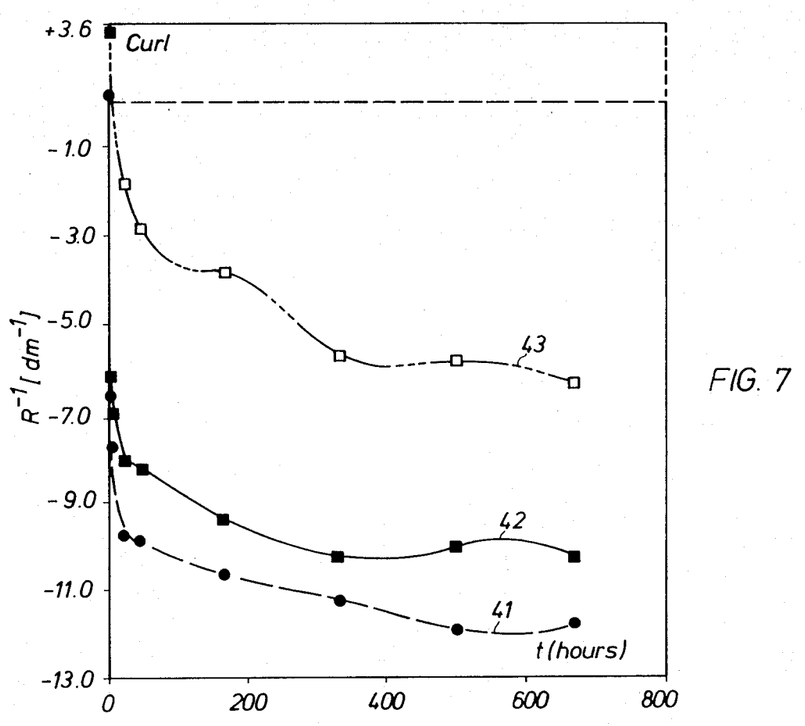
FIG. 7 is a diagram illustrating the evolution of film curl for small winding radii.

The diagram of FIG. 7 illustrates the evolution of film curl for very small winding radii. The example which is illustrated in this diagram was done in order to have an insight in the improvement that may be obtained by means of the inventive process, for the compensation of core-set curl induced by very small cores. The latter situation occurs in particular in the field of amateur photography in which 35 mm film is wound on a core with a diameter of 12 mm.

The measurements were carried out on PET film strips measuring 35×10 mm, wound on a core of 8 mm diameter. The core-set curl was so strong that the test method described in the introduction of this application could not be used. For that reason, the radius of the curling film specimen was measured instead of the height of the upstanding corners. The results are expressed on the ordinate of the diagram as $R^{-1} \times [dm^{-1}]$.

The curve 41 stands for the core-setting at 45° C. of a wound film strip that did not undergo a treatment in accordance with the process of the invention.

The curve 42 stands for core-setting of a wound film strip at 45° C. that had an opposite curl of $R^{-1} = 3.6$ $dm^{-1}$ obtained in accordance with the invention. It is clear that the inventive process conducts to some reduction of the core set curl, but that the small diameter core still causes an important film curl.

Finally, curve 43 illustrates the behaviour of a film strip at 20° C., that started with an opposite curl of $R^{-1} = 3.6$ $dm^{-1}$ in accordance with the process of the present invention.

The process according to the present invention is not limited to the described examples.

The film tension during the longitudinal stretching may exceed the maximum value of 7 N/sq. mm shown in FIG. 4, but a value of 10 N/sq. mm is considered as a practical maximum for obtaining any desirable curl in practice.

The temperature gradient Delta T may be smaller or greater than the value of 30° C. examplified in FIG. 4, but an interval of 10° C. is considered as a minimum value in order to obtain any usable effect.

The differential stretch-heating of the film may be done also in other ways than the illustrated one. The mediumwave heater 22 may be replaced by a shortwave heater, the power of which differs from that of the shortwave heater 23 so that yet a desired temperature gradient is obtained over the film.

The pre-heaters 20 and 21 may have different powers, so that these heaters cause already a certain temperature gradient across the film thickness.

The rollers 18 may be heated and arranged to cause an asymmetric pre-heating of the film.

In the illustrated embodiment of FIGS. 1 and 2, the film side that was in contact with the air while on the first cooling roller 11, was subjected to the mediumwave stretch heating. In this way, the curling tendency that is occasionally caused in the film by the asymmetric cooling by the cooling roller, may amplify the effect of the curling obtained in accordance with the process of the invention. However, the curling tendency imposed by any cooling drum is small, and thereby the position of the heaters 22 and 23 may also be reversed in practice.

We claim:

1. In a process for making biaxially oriented photographic polyethylene terephthalate film by the steps comprising extruding molten polyethylene terephthalate polymer through a flat die slot onto a cooling drum to cool down the same, subjecting the film to molecular orientation by stretching the cooled down film longitudinally and transversely, and heat-setting the film, wherein the film is longitudinally stretched by applying longitudinal stretching forces to the film while heating the film, said heating comprising first pre-heating the film to increase the film temperature but not sufficiently for plastic elongation to occur, and then stretching the film while it is heated to a temperature above the Tg (glass transition temperature) in a zone where the film is unsupported, whereby rapid plastic elongation occurs under the stretching forces, and then rapidly cooling to a temperature below the Tg to arrest the stretching; the improvement of imparting longitudinal curvature of a given degree by the steps of controlling the heating of the film during longitudinal stretching so that a temperature gradient Delta T exits across the film thickness from one surface of the film to the other which is larger than 10° C., and regulating the longitudinal tension applied to the film during such stretching to less than 10 N/sq. mm.

2. A process according to claim 1, wherein the temperature gradient Delta T is larger than 15° C.

3. A process according to claim 1, wherein the longitudinal tension of the film during stretching is less than 7 N/sq. mm.

4. A process according to claim 1, wherein the stretch-heating of the film occurs by exposing one film side to mediumwave IR-radiation and the opposite side of the film to shortwave IR-radiation.

5. A process according to claim 4, wherein the mediumwave IR-radiation causes the highest of the two film surface temperatures.

6. A process according to claim 1, wherein the stretch-heating of the film occurs by exposing both film sides to shortwave IR-radiation.

7. A process according to claim 1, wherein the pre-heating of the film occurs by exposing both sides of the film to shortwave IR-radiation.

8. A process according to claim 1, wherein the rapid cooling of the film is effected by conveying the film through a body of cool liquid.

9. A process according to claim 1, wherein the heat-set film is wound-up on a roll with the film side that was subjected to the highest stretching temperature facing inwardly.

10. A process according to claim 9, comprising unwinding and coating the wound roll of heat-set film, slitting and cutting the film into multiple film strips, and winding said multiple film strips each separately to small rolls, the initial inner film side being now the outer film side of each small roll, whereby the longitudinal curvature imparted to the film is opposite to the coil-set undergone by the film while wound upon said small roll to at least partially offset the latter.

* * * * *